United States Patent [19]
Kurata

[11] Patent Number: 5,187,400
[45] Date of Patent: Feb. 16, 1993

[54] VIBRATION-PROOF STEPPING MOTOR WITH BUILT-UP STATOR

[75] Inventor: Kazuyuki Kurata, Shizuoka, Japan

[73] Assignee: Asmo Co., Ltd., Shizuoka, Japan

[21] Appl. No.: 908,873

[22] Filed: Jul. 7, 1992

Related U.S. Application Data

[63] Continuation of Ser. No. 791,324, Nov. 14, 1991, abandoned.

[30] Foreign Application Priority Data

Nov. 16, 1990 [JP] Japan .............................. 2-119331[U]

[51] Int. Cl.⁵ ........................ H02K 37/00; H02K 5/00
[52] U.S. Cl. .................................. 310/49 R; 310/51; 310/89
[58] Field of Search .................. 310/49 R, 51, 89, 91, 310/99

[56] References Cited

U.S. PATENT DOCUMENTS

| | | | |
|---|---|---|---|
| 3,558,940 | 1/1971 | Chestnut et al. | 310/41 |
| 3,783,313 | 1/1974 | Mathur | 310/49 R |
| 4,107,559 | 8/1978 | Patel | 310/49 R |
| 4,333,026 | 6/1982 | Bock et al. | 310/42 |
| 4,381,465 | 4/1983 | Renkl et al. | 310/49 R |
| 4,841,190 | 6/1989 | Matsushita et al. | 310/257 |
| 5,043,613 | 8/1991 | Kurata et al. | 310/49 R |

FOREIGN PATENT DOCUMENTS

| | | | |
|---|---|---|---|
| 0079830 | 5/1983 | European Pat. Off. | 310/49 R |
| 7436513.2 | 8/1975 | Fed. Rep. of Germany | 314/49 R |
| 2829945 | 1/1980 | Fed. Rep. of Germany | 310/49 R |
| 52-126711 | 10/1977 | Japan | 310/49 R |
| 61-4459 | 1/1986 | Japan | 310/49 R |
| 61-150631 | 7/1986 | Japan | 310/49 R |
| 61-189146 | 8/1986 | Japan. | |
| 841607 | 7/1960 | United Kingdom | 310/49 R |
| 1548645 | 7/1979 | United Kingdom | 310/49 R |

Primary Examiner—Steven L. Stephan
Assistant Examiner—Matthew Nguyen
Attorney, Agent, or Firm—Burns, Doane, Swecker & Mathis

[57] ABSTRACT

A vibration-proof stepping motor of the type having a stator of a built-up construction is disclosed, wherein the stator is composed of a single socket-like stator core member and a plurality of plug-like stator core members assembled with the socket-like stator core member in stacking relation, with stator coils disposed between adjacent pairs of the stator core members. An upper end of the plug-like stator core members which are stacked in the socket-like stator core member together with the stator coils projects from an upper end of the socket-like stator core member. A bobbin of each of the stator coils is resiliently deformable so that the stator is firmly retained by and between upper and lower housings in a compressed condition when the housings are joined together. With the stator thus retained, the stepping motor is free from vibration which would otherwise lead to generation of unpleasant operation noise.

20 Claims, 6 Drawing Sheets

VIBRATION-PROOF STEPPING MOTOR WITH BUILT-UP STATOR

This application is a continuation of application Ser. No. 07/791,324, filed Nov. 14, 1991, now abandoned.

BACKGROUND OF THE INVENTION

1. Field of the Invention

The present invention relates generally to stepping motors, and more particularly to a vibration-proof stepping motor with a built-up stator which is suitable for an automated assembling.

2. Description of the Prior Art

Conventionally, stepping motors include a stator and a rotor disposed in a housing and assembled together in a built-up construction by means of screw fasteners. With this screwed assembly, stator cores are prevented from interfering with each other.

For a purpose of automated assembling, various attempts have been proposed to construct stator cores which can be assembled layerwise without using screw fasteners. One such proposed stator core construction is a so-called "claw-pole" construction. In the case of the conventional construction, when a stator coil is energized, the assembled stator cores tend to oscillate in resonance with the excited stator coil, thus generating unpleasant noises.

U.S. Pat. No. 5,043,613 discloses vibration isolating dampers disposed between adjacent stator cores for solving the noise problem. The disclosed dampers are satisfactory in terms of vibration isolating effect. However, in terms of automated assembling, they needs an additional damper positioning and mounting operations which must be performed with accuracy. There is a demand for a stepping motor which is suited for automated assembling and is capable of reliably isolating vibrations and vibration-induced noises without increasing the number of components.

SUMMARY OF THE INVENTION

It is accordingly an object of the present invention to provide a stepping motor of the type suitable for automated assembling which has structural features capable of preventing generating of noises caused by interference between stator cores stacked one above another.

Another object of this invention is to provide a vibration-proof stepping motor having a stator of a built-up construction which enables an efficient automated assembling of the stepping motor.

A vibration-proof stepping motor of this invention includes a lower housing having an internal space, an upper housing disposed in confrontation to the lower housing, and a stator and a rotor disposed between the upper and lower housings. The stator is composed of at least two stator cores disposed one above another in the internal space and each including a pair of stator core members and a coil disposed between the stator core members. The rotor is rotatably disposed in the stator and has a rotor shaft and a rotor body integral with the rotor shaft. The stator is composed of a socket-like stator core member having a plurality of upstanding magnetic poles and a plurality pluglike stator core members each having a plurality of upstanding magnetic poles. The plug-like stator core members are stacked in the socket-like stator core members with the coil disposed between each adjacent pair of the stator core members. The coil includes a bobbin, windings wound around the bobbin and a plurality of terminals electrically connected with the windings. The bobbin has opposite end flanges between which the windings are disposed, one of the end flanges having a mounting portion carrying thereon the terminals. The one end flange has a first projection and a low damper projection, the first projection having a height larger than the thickness of the material of the plug-like stator core members. The other of the end flanges has at least one second projection having a height smaller than the thickness of the material of the stator core members. The plug-like stator core members stacked in the socket-like stator core members together with the coils have an upper end projecting from an upper end of the socket-like stator core member.

Due to the provision of the low damper projection on one end flange of the bobbin, the plug-like stator core members stacked in the socket-like stator core along with the stator coils slightly projects from an upper end of the socket-like stator core member, so that in a preassembled condition, the upper and lower flanges are slightly spaced from one another. Consequently, when the upper and lower flanges are joined together, they are forced toward each other whereupon the stator is compressed between the housing. The individual components of the stator thus compressed come into intimate contact with each other and hence they cannot vibrate when the coils are exited. Thus, the stepping motor is free from vibration-induced operation noise.

Preferably, the stator coils are stacked such that the one end flange of each bobbin on which the damper projection is provided is disposed in confrontation with the one end flange of the adjacent bobbin. With this arrangement, any movement tending to vibrate the plug-like stator core members is absorbed efficiently by the damper projections.

The lower housing may have on its side wall a rib projecting into the interior space. The rib is press-fitted with a side wall of the socket-like stator core member, so that the socket-like stator core member is firmly retained within the lower housing against displacement and vibration.

The stator is composed of a single socket-like stator core member in which coils and plug-like stator core members are disposed in stacked relation. The stator can, therefore, be assembled merely by setting the socket-like stator core member into the lower housing. This construction extends the degree of freedom in determining the sequence of assembling operation, and improves yield and assembling efficiency.

The above and other objects, features and advantages of the present invention will become more apparent from the following description when making reference to the detailed description and the accompanying sheets of drawings in which preferred structural embodiments incorporating the principles of the present invention are shown by way of illustrative examples.

DETAILED DESCRIPTION OF THE INVENTION

Figure 1:
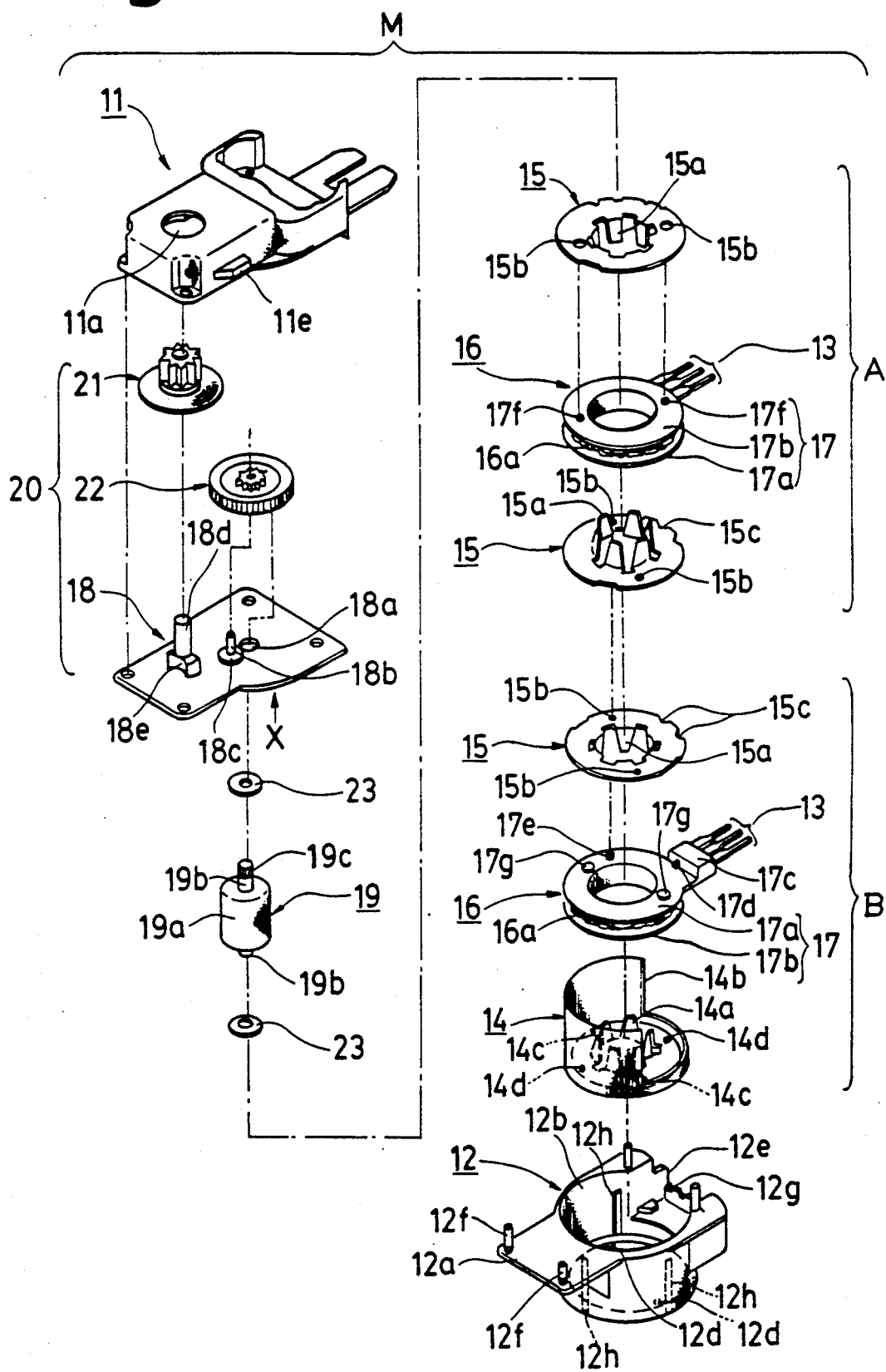
FIG. 1 is an exploded perspective view of a stepping motor according to the present invention.
Figure 2:
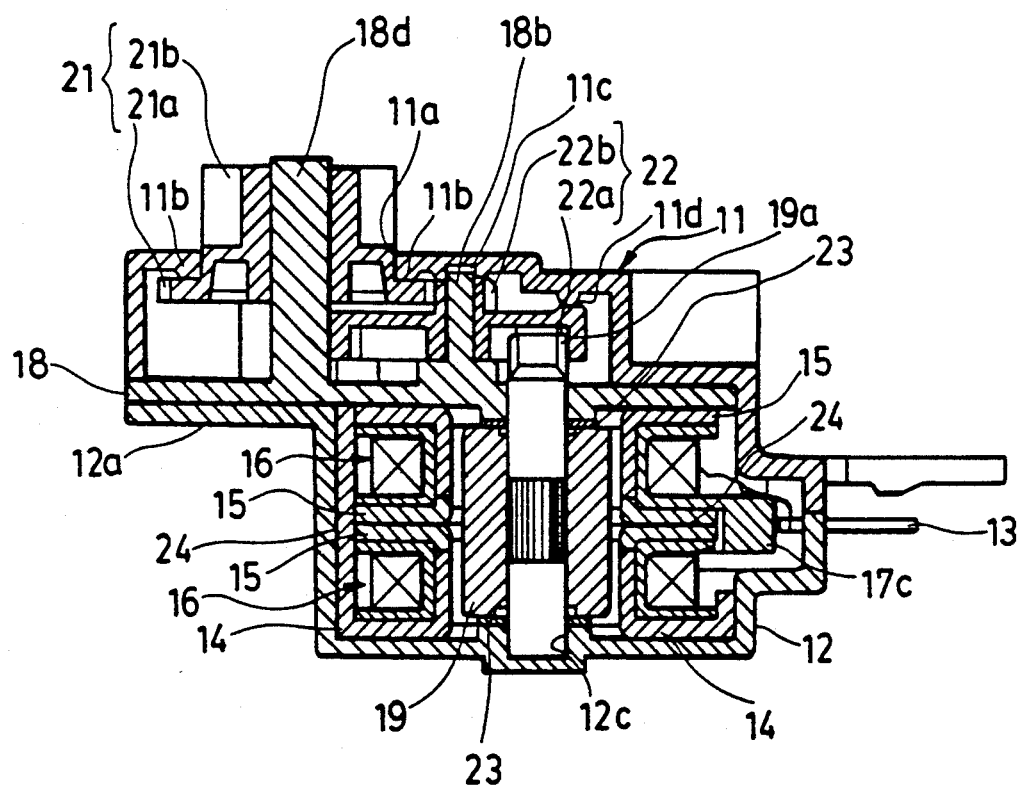
FIG. 2 is a vertical cross-sectional view of the stepping motor.

As shown in FIG. 1 and 2, a stepping motor M embodying the present invention generally comprises two housings 11, 12, an annular stator composed of two stator cores A, B comprising a socket-like stator core member 14, three plug-like stator core members 15 and two coils 16, a support plate 18, a rotor 19 composed of a rotor shaft and a rotor body integral with the rotor shaft, and a reduction gear 20 including a first gear 22 and a second gear 21, all the component parts 14–22 being assembled with each other within an internal space defined jointly by and between the two housings 11, 12.

Figure 6:
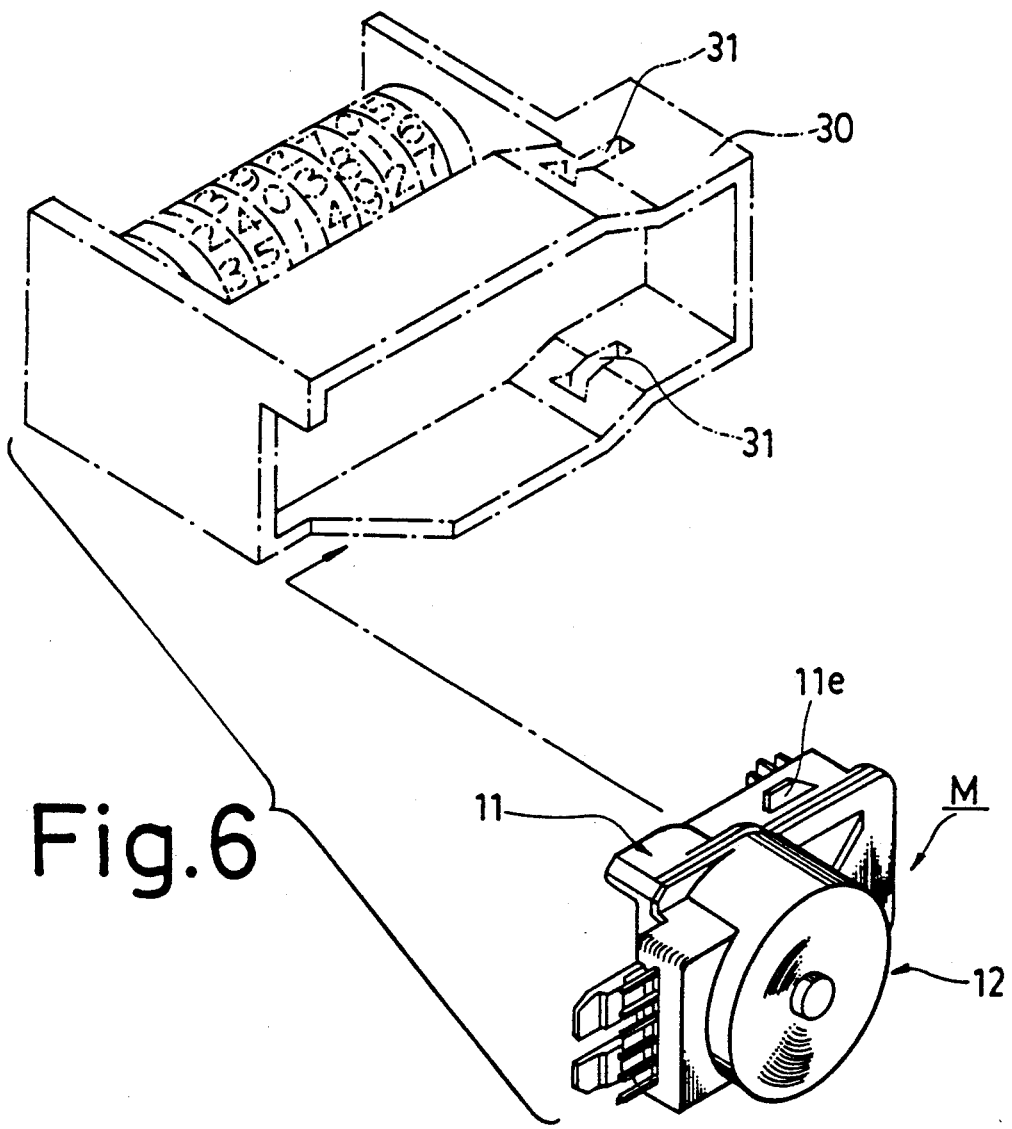
FIG. 6 is a perspective view of the stepping motor as it is with an odometer.

The housing 11 which is disposed on the output side of the stepping motor and hereinafter referred to as "upper housing" has a circular hole 11a through which the second gear 21 of the reduction gear 20 is partly exposed. As shown in FIG. 2, the upper housing 11 has on its under surface an annular projection or rib 11b extending around the full circumference of the hole 11a for guided engagement with a lower gear 21a of the second gear 21. A circular bearing recess 11c is formed in the under surface of the upper housing 11 adjacent to the hole 11a for receiving therein an end of a support shaft 18b on which the first gear 22 is journaled. Also formed on the under surface of the upper housing 11 is a semicircular rib 11d extending concentrically around the bearing recess 11c for guided engagement with the first gear 22. The upper housing 11 further has a pair of locking projections or wings 11e, 11e sidewalls thereof. The locking wings 11e are adapted to be received in a pair of retaining holes 31, 31, respectively, formed in a frame 30 of an apparatus such as an odometer for assembling the stepping motor M with the apparatus, as shown in FIG. 6.

The housing 12 disposed opposite to the output side of the stepping motor and hereinafter referred to as "lower housing" includes, as shown in FIGS. 1 and 2, a substantially cup-shaped body 12b for receiving therein the stator, and a rectangular flange 12a extending perpendicularly from an open end of the cup-shaped body 12b. The body 12b has in its bottom surface a central circular bearing recess 12c (FIG. 2) for receiving therein one end of a rotor shaft, and a pair of guide projections 12d, 12d (one being shown in FIG. 1) for positioning the stator core B. The housing body 12b further has three elongate rigs 12h projecting radially inwardly from a side wall of the housing body 12b and extending parallel to a longitudinal axis of the housing body 12b. The ribs 12b are circumferentially spaced at equal angular intervals. The number of the ribs 12b may be two or less so long as they are able to stably and firmly retain the socket-like stator core member 14 within the housing body 12b when the stator core member 14 is received in the housing body 12b as described later. The housing body 12b has a recessed portion 12e located diametrically opposite to the flange 12a for receiving therein a terminal assembly.

The recessed portion 12e has a plurality of laterally spaced grooves 12g for receiving therein respective terminals 13 of the terminal assembly. Each of the terminals 13 has an outer end portion projecting outwardly from the lower housing 12 and an inner end portion connected to the coil 16 within the lower housing 12, the inner end portion being wider than the outer end portion. The grooves 12g are complementary in contour to the shape of the terminals so as to snugly receive therein the corresponding terminals.

The lower housing 12 further has four locking projections 12f on an upper surface thereof at positions corresponding to the positions of the respective mounting holes 11f of the upper housing 11. The locking projections 12f are received in the corresponding ones of the mounting holes 11f and thermally welded to the material defining the mounting holes 11f, as described below.

The stator is composed of upper and lower stator cores A, B stacked together. The stator cores A, B are of the so-called "claw-pole" construction. The upper stator core A is composed of a pair of plug-like stator core members 15 and 15 and assembled together with a stator coil 16 disposed therebetween. The lower stator core B is composed of a socket-like stator core member 14 and a plug-like stator core member 15 assembled with the stator core member 14 with a stator coil 16 disposed between the stator core members 14, 15. The socket-like stator core member 14 is press-formed from a sheet metal and has a plurality (six in the illustrated embodiment) of upstanding claw-like magnetic poles 14a (hereinafter referred to as "claw-pole") projecting from the bottom wall thereof and circumferentially spaced at equal angular intervals (at an angle of 60 degrees in the illustrated embodiment). The socket-like stator core member 14 has a height slightly smaller than the overall height of the stator in a preassembled condition which is composed of the stator core member 14, stator core members 15 and coils 16 stacked one above another. The plug-like stator core member 15 is also pressed-formed from a sheet metal and has on its bottom wall a plurality of upstanding claw poles 15a corresponding in number to the number of the claw poles 14a of the socket-like stator core member 14, the claw poles 15a being circumferentially spaced at equal angular intervals (at an angle of 60 degrees in the illustrated embodiment).

The socket-like stator core member 14 further has a recess 14b formed in an annular side wall thereof for positioning the terminals 13. The annular side wall of the socket-like stator core member 14 has an outside diameter which is at least equal to, and preferably slightly larger than, the diameter of a circle formed jointly by the ribs 12h of the lower housing 12 for a purpose described below. A pair of diametrically opposite first guide holes 14c and a pair of diametrically opposite second guide holes 14d are formed in the bottom wall of the stator core member 14. Each of the first guide holes 14c and one of the second guide holes 14d is circumferentially spaced apart at an angle of 82.5 degrees, while the other second guide hole 14d is circumferentially spaced from this first guide hole 14c at an angle of 97.5 degrees. The first and second guide holes 14c, 14d have different diameters and in the illustrated embodiment, the first guide holes 14c are larger in diameter than the second guide holes 14d. The first guide holes 14c are in radial alignment with two diametrically opposed claw poles 14a and fitted over the guide projections 12d of the lower housing 12. The second guide holes 14d are fitted over two locking projections 17f provided on a bobbin 17, described later, of the stator coil 16.

Figure 7:
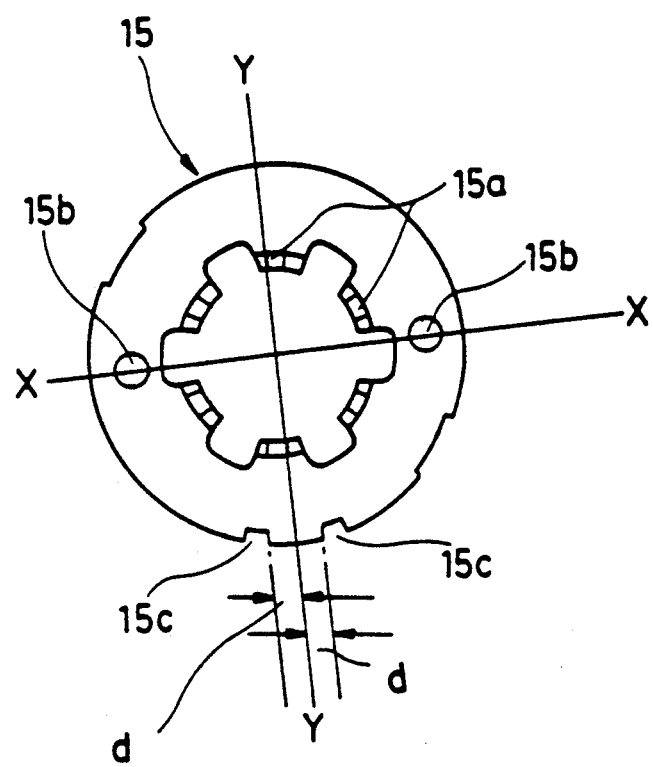
FIG. 7 is a plan view of a plug-like stator core according to another embodiment of this invention.

The plug-like stator core member 15 has a pair of diametrically opposite guide holes 15b each disposed between two adjacent ones of the upstanding claw poles 15a but angularly displaced toward one of the two adjacent claw poles at an angle of 7.5 degrees. The plug-like stator core member 15 further has two circumferentially spaced cutout recesses 15c along an outer peripheral edge thereof. Each of the cutout recesses 15c is spaced at an angle of 82.5 degrees from an adjacent one of the guide holes 15b. The cutout recesses 15c are corresponding in position to the position of the recessed portion 12e of the lower housing 12. The guide holes 15b are engageable with a locking projection 17e formed on the coil bobbin 17, described later. The cutout recesses 15c are engageable with a locking projection 17d on a mounting portion 17c, described later, for the terminals 13. The claw poles 14a of the socket-like stator core member 14 and the claw poles 15a of the plug-like stator core member 15 are 30 degrees out-of-phase. The above-mentioned position of the cutout recesses 15c formed in the plug-like stator core member 15 is not restrictive but illustrative. It is possible to change the position of the cutout recesses 15c, as shown in FIG. 7. In the modified embodiment shown in FIG. 7, the two cutout recesses 15c are equidistantly spaced by a distance "d" of 1.35 mm from a plane Y—Y which lies in a central axis of the plug-like stator core member 15 and extends perpendicular to a plane X—X extending across two guide holes 15b.

Figure 4:
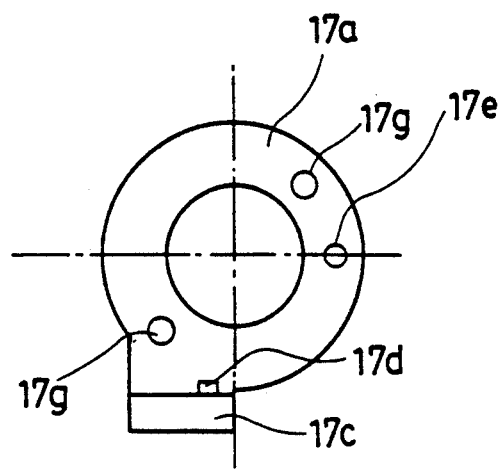
FIG. 4 is a plan view of a bobbin showing one side to which terminals are mounted.
Figure 5:
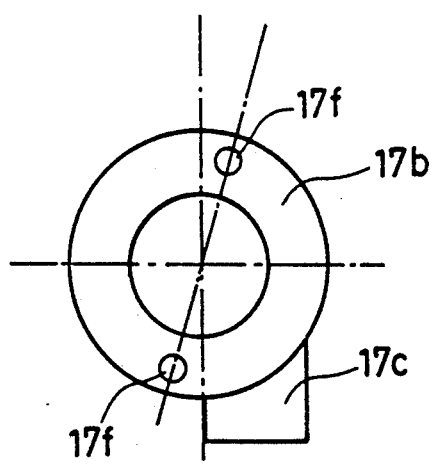
FIG. 5 is a plan view showing the opposite side of the bobbin.

The stator coil 16 is composed of a bobbin 17, conductor windings 16a and a plurality of terminals 13. The bobbin 17 has opposite end flanges 17a, 17b between which conductor windings 16a are wound. The end flange 17a is provided with the terminals 13 while the opposite end flange 17b is free of the terminals 13. Ends of the conductor windings 16a are electrically connected with the terminals 13. The end flange 17a includes a substantially rectangular mounting portion 17c extending tangentially and outwardly for supporting thereon the terminals 13. As better shown in FIG. 4, the end flange 17a has a first locking projection 17d adjacent to an inner side wall of the mounting portion 17c and lockingly engageable with one of the cutout recesses 15c of the plug-like stator core member 15. The locking projection 17d has a height larger than the thickness of the material of the plug-like stator core member 15. The end flange 17a further has a second locking projection 17e (FIGS. 1 and 4) extending parallel to the axis of the bobbin 17 and lockingly engageable with one of the guide holes 15b of the plug-like stator core member 15, and a pair of diametrically opposite damper projections 17g. The second locking projection 17e has a height lager than the thickness of the material of the plug-like stator core member 15. In the illustrated embodiment, one of the damper projections 17g is disposed near the second locking projection 17e. The damper projections 17g are smaller in height than the first and second locking projections 17d, 17e. The height of the damper projections 17g is determined in a manner described below. When the upper and lower housings 11, 12 are joined together by thermal welding with the upper and lower stator cores A, B stacked together within the housings 11, 12, the damper projections 17g tend to provide a space between the housings 11, 12. In this instance, however, since the bobbin 17 of each stator core A, B is formed of an engineering plastic or the like material having a certain degree of resiliency, as described later, it is possible to compress the upper and lower housings 11, 12 until they are closely fitted together against the resiliency of the bobbin 17 so as to enable thermal welding of the upper and lower housings 11, 12. However, if the force or pressure exerted on the housings 11, 12 exceeds the resiliency of the bobbin 17, the bobbin 17 would be damaged or otherwise broken. Thus, the height of the damper projections 17g is determined such that a force or pressure exceeding the resiliency of the bobbin 17 is not exerted on the bobbin 17 when the upper and lower housings 11, 12 are forced together into intimate contact with each other against the resiliency of the bobbin 17.

With this arrangement, the upper and lower stator cores A, B are depressed sufficiently when the upper housing 11 is joined with the lower housing 12 after lower stator core B, the upper stator core A and the plate 18 are stacked in succession in the lower housing 12 in the order named.

The end flange 17b of the lower stator core B has a pair of diametrically opposite locking projections 17f lockingly engageable with the guide holes 14d, respectively, of the socket-like stator core member 14. The height of the locking projections 17f is smaller than the thickness of the material of the socket-like stator core member 14.

In the socket-like stator core member 14, the stator coil 16 and the plug-like stator core member 15 are stacked in the order named so as to form the lower stator core B onto which the plug-like stator core member 15, the stator coil 16 and the plug-like stator core member 15 are stacked in succession to form the upper stator core A. Thus, the upper stator core A is stacked on the lower stator core B. In this instance, the plug-like stator core member 15 of the lower stator core B and the lower plug-like stator core member 15 of the upper stator core A are disposed in back-to-back confrontation with their respective claw-poles 15a directed away from each other.

Figure 3:
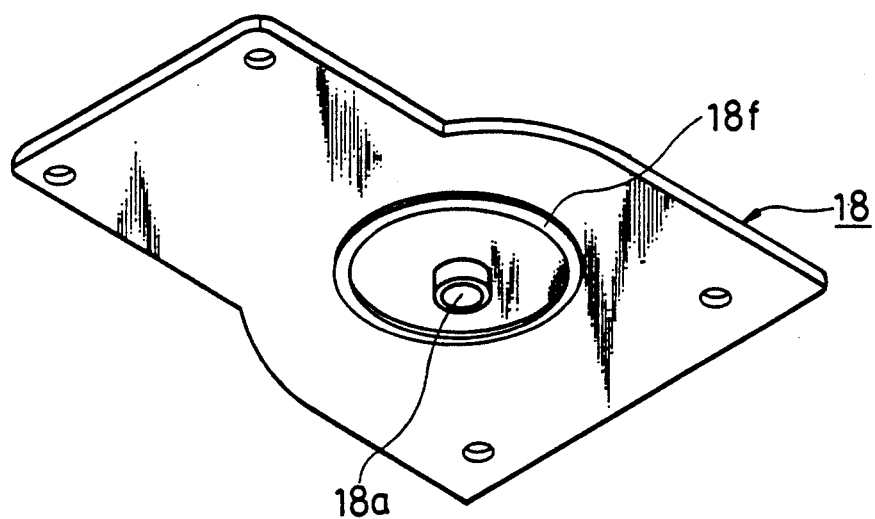
FIG. 3 is an enlarged perspective view of a plate of the stepping motor taken in the direction of the arrow X in FIG. 1.

The support plate 18 is disposed between the upper housing 11 and the lower housing 12. The support plate 18 has a configuration substantially the same as the configuration of the lower housing 12 and is formed from a material containing carbon. In the illustrated embodiment, the support plate 18 is made of a plastic material comprising 70% of polyphenylene sulfate and 30% of carbon. The support plate 18 serves both as a bearing for the rotor 19 and as a support for gears of the reduction gear 20. As shown in FIG. 1, the support plate 18 has a circular bearing hole 18a for receiving therein the opposite end of the rotor shaft 19b, a first upstanding support shaft 18b disposed adjacent to the bearing hole 18a for rotatably supporting thereon the first gear 22 of the reduction gear 20, and a circular boss 18c at the base of the first support shaft 18b for retaining thereon the first gear 22. A second support shaft 18d for rotatably supporting thereon the second gear 21 is disposed on the support plate 18 adjacent to the first support shaft 18b. The second support shaft 18d includes a circular boss 18e at the base thereof for retaining thereon the second gear 21. As shown in FIG. 3, the support plate 18 has on its under surface (facing to the stator side) an annular rib 18f extending concentrically around the bearing hole 18a. The rib 18f has a height considerably smaller than the thickness of the support plate 18 and is engageable with an upper surface of the topmost plug-like core member 15 for a purpose described below.

The rotor 19 includes a rotor body 19a formed of a plastic permanent magnet, and a rotor shaft 19b formed integrally with the rotor body 19a. The rotor shaft 19b has an output end on which is formed a drive gear composed of a pinion 19c as shown in FIG. 1. The pinion 19c is placed in driving mesh with the first gear 22 of the reduction gear 20.

As described above, the reduction gear 20 is composed of the first gear 22 and the second gear 21. Each of the gears 22, 21 is a composite gear having an upper gear and a lower gear united together in co-axial arrangement. The lower gear 22a of the first gear 22 is an internal gear having on its inside peripheral edge a plurality of gear teeth held in driven mesh with the pinion 19c. The upper gear 22b of the first gear 22 is an external gear which is held in driving mesh with the lower gear 21a of the second gear 21. The lower gear 21a is disposed in the upper housing 11, while the upper gear 21b projects from the upper housing 11 through the circular hole 11a in the upper housing 11. The first gear 22 is journaled on the first support shaft 18b of the support plate 18, with the lower internal gear 22a rotatably supported on the boss 18c of the first support shaft 18b. The second gear 21 is journaled on the second support shaft 18d on the support plate 18, with the lower gear 21a rotatably supported on the boss 18e of the second support shaft 18d.

The foregoing component parts of the stepping motor M are assembled together in the manner described below. In brief, structural component parts of the lower stator core B are stacked successively one above another in the lower housing 12 and subsequently structural component parts of the upper stator core A are stacked successively one above another in the lower housing 12. Thereafter, the rotor 19, the support plate 18, the reduction gear 20 and the upper housing 11 are stacked in the order named. A sequence of the assembling operation will be described below in greater detail.

After the socket-like stator core member 14 of the lower stator core B is supported in a horizontal plane with its open end facing upward, the coil 16 is placed on the socket-like stator core member 14. In this instance, the respective terminals 13 are snugly received in the corresponding grooves 12g of the lower housing 12 whereupon the locking projections 17f on the bobbin 17 are brought into fitting engagement with the second guide holes 14d of the socket-like stator core member 14.

Subsequently, the plug-like stator core member 15 of the lower stator core B is placed over the coil 16 with its claw poles 15a directed downward until one of the guide holes 15b and one of the cutout recesses 15c are held in locking engagement, respectively, with the locking projection 17e on the end flange 17a and the locking projection 17d on the mounting portion 17c of the bobbin 17. The lower stator core B is thus assembled with the lower housing 12. In this assembled condition, the claw poles 14a of the socket-like stator core member 14 and the claw poles 15a of the plug-like stator core member 15 are circumferentially spaced at equal angular intervals (30 degrees in the illustrated embodiment). The locking projections 17d, 17e project upwardly beyond the thickness of the material of the plug-like stator core member 15.

Thereafter, the upper stator core A is assembled in which instance the plug-like stator core member 15 is first placed on the plug-like stator core member 15 of the lower stator core B, with the claw poles 15a directed upward. In this instance, one of the guide holes 15b of the plug-like stator core member 15 is fitted over the locking projection 17e on the bobbin 17, and one of the cutout recesses 15b is fitted over the locking projection 17d of the bobbin 17. The plug-like stator core member 15 of the upper stator core A is thus positioned accurately relative to the plug-like stator core member 15 of the lower stator core B.

Then, with the locking projection 17e facing downward, the coil 16 of the upper stator core A is placed over the plug-like stator core member 15 in the manner same as done with the coil 16 of the lower stator core B except that the locking projection 17e on the end flange 17a is fitted in the other guide hole 15b of the plug-like stator core member 15 which is not engaged with the locking projection 17e of the bobbin 17 of the lower stator core B, and that the locking projection 17d on the mounting portion 17e of the upper coil 16 is fitted in the other cutout recess 15c which is not occupied with the locking projection 17d of the lower coil 16.

Subsequently, the plug-like stator core member 15 of the upper stator core A is placed over the coil 16 with its claw poles 15a directed downward. In this instance, the guide holes 15b of the plug-like stator core member 15 are fitted with the locking projections 17f of the bobbin 17. With the upper stator core A thus assembled, the claw poles 15a of the upper plug-like stator core member 15 and the claw poles 15a of the lower plug-like stator core member 15 are circumferentially spaced at equal angular intervals (30 degrees in the illustrated embodiment). Consequently, the claw poles 14a, 15a of the four stator core members 14, 15, 15 and 15 are circumferentially spaced at equal angular intervals (15 degrees in the illustrated embodiment).

Then, the lower housing 12 is supported in a horizontal plane with its open end facing upward, and after that the stator built-up with the upper and lower stator cores A, B assembled together as described above is press-fitted into the lower housing 12. In this instance, the recess 14b of the socket-like stator core member 14 is aligned with the recessed portion 12e of the lower housing 12, and the first guide holes 14c of the socket-like stator core member 14 are fitted with the locking projections 12d of the lower housing 12. Since the first guide holes 14c have a different diameter to the diameter of the second guide holes 14d, the stator can be assembled reliably without mismatching.

Thereafter, the rotor 19 is inserted into the stator cores A, B with the input end directed forward until the input end is received in the baring recess 12c of the lower housing 12 with a washer 23 disposed between the rotor body 19a and the lower housing 12. Another washer 23 is fitted over the output end of the rotor shaft 19b.

Subsequently, the support plate 18 is placed over the lower housing 12 while four guide holes (not designated) of the support plate 18 are being held in alignment with the locking projections 12f of the lower housing 12. In this instance, the output end of the rotor shaft 19b is rotatably received in the bearing hole 18a in the support plate 18 the topmost plug-like stator core member 15 of the built-up stator slightly projects from an upper end of the socket-like stator core member 14, and the annular rib 18b on the under surface of the support plate 18 is held in contact with an upper surface of the topmost plug-like stator core member 15, so that the support plate 18 is slightly spaced from an upper surface of the lower housing 12.

Then, the first gear 22 is fitted over the first support shaft 18b on the support plate 18 to mesh the lower internal gear 22a with the pinion 19c, and after that the second gear 21 is fitted over the second support shaft 18d on the support plate 18 to place the lower gear 21a into meshing engagement with the upper gear 22b of the first gear 22.

Thereafter, the upper housing 11 is placed over the support plate 18 to cover a substantial part of the reduction gear 20. In this instance, four mounting holes (not designated) of the upper housing 11 are fitted over the locking projections 12f on the lower housing 12, and the upper gear 21b of the second gear 21 projects from the upper housing 11 through the circular hole 11a in the upper housing 11. Finally, the locking projections 12f are fused by thermal welding to thereby join the upper and lower housings 11, 12.

Prior to the thermal welding, the upper and lower housings 11, 12 are slightly spaced from one another partly because the topmost plug-like stator core member 15 of the assembled stator slightly projects from the upper end of the socket-like stator core member 14, and partly because the annular rib 18f is held in contact with the upper surface of the topmost plug-like stator core member 15 of the assembled stator. Since the bobbins 17 are formed of a resiliently deformable material as described above, the upper and lower housings 11, 12 can be brought into intimate contact with each other by forcing them toward each other against the resiliency of the bobbins 17. While keeping the upper and lower housings 11, 12 in a compressed condition, the thermal welding is performed to join the upper and lower housings 11, 12. With this thermal welding of the upper and lower housings 11, 12, the individual components of the stator disposed between these housings 11, 12 are held in contact with each other. In particular, the plug-like stator core member 15 of the lower stator core B and the lower plug-like stator core member 15 of the upper stator core A come closely into back-to-back contact.

When the upper housing 11 is forced toward the lower housing 12, the annular rib 18f formed on the under surface of the support plate 18 forces the upper surface of the topmost plug-like stator core member 15 downward to resiliently deform the bobbins 17 until the upper housing 11 comes into close contact with the lower housing 12.

The bobbins 17 in the illustrated embodiment each have two damper projections 17g on the flange 17a. This is illustrative and not restrictive. The number of the damper projection 17g may be one, for example. However, a single damper projection 17g provides an uneven spacing between the flange 17a of each bobbin 17 and the confronting plug-like stator core member 15, so that the functional effect of the single damper projection 17g is not quite satisfactory. It is, therefore, preferable that two or more damper projections 17g are provided on the flange 17a of the bobbin 17. The shape of the damper projections 17g is not limited to the illustrated embodiment.

The stepping motor M of the foregoing embodiment includes a built-in reduction gear 20. It is possible to construct the stepping motor M without the reduction gear 20 in which instance, however, the upper housing 11 must be replaced with one which is similar to the support plate 18 but devoid of those components provided for supporting the gears 21, 22. More specifically, the upper housing has a bearing hole (identical to the bearing hole 18a) for rotatably supporting the output end portion of the rotor shaft 19b with the pinion 19c projecting outwardly from the housing, and further has on its under surface an annular rib (identical to the annular rib 18f) engaged by the upper surface of the stator. The pinion 19c is meshed with a driven gear of a separate reduction gear unit when the stepping motor is assembled with the reduction gear unit in the well-known manner.

Obviously, various minor changes and modifications of the present invention are possible in the light of the above teaching. It is therefore to be understood that within the scope of the appended claims the invention may be practiced otherwise than as specifically described.

What is claimed is:

1. A vibration-proof stepping motor of the type having a stator of a built-up construction, comprising:
    a lower housing having an internal space;
    an upper housing disposed in confrontation to said lower housing; and
    a stator and a rotor disposed between said upper and lower housings, said stator being composed of at least two stator cores disposed one above another in said internal space and each including a pair of stator core members and a coil disposed between said stator core members, said rotor being rotatably disposed in said stator and having a rotor shaft and a rotor body integral with said rotor shaft,
    wherein said stator is composed of a socket-like stator core member having a plurality of upstanding magnetic poles and a plurality plug-like stator core members each having a plurality of upstanding magnetic poles, said pluglike stator core members being stacked in said socket-like stator core members with said coil disposed between each adjacent pair of said stator core members,
    wherein said coil includes a bobbin, windings wound around said bobbin and a plurality of terminals electrically connected with said windings, said bobbin having opposite end flanges between which said windings are disposed, one of said end flanges having a mounting portion carrying thereon said terminals,
    wherein said one end flange has a first projection and a lower damper projection, said first projection having a height larger than the thickness of the material of said plug-like stator core members,
    wherein the other of said end flanges has at least one second projection having a height smaller than the thickness of the material of said stator core members, and
    wherein said plug-like stator core members stacked in said socket-like stator core members together with said coils have an upper end projecting from an upper end of said socket-like stator core member.

2. A vibration-proof stepping motor according to claim 1, wherein said coils are stacked such that said one end flange of each of said coils confronts said one end flange of the adjacent coil.

3. A vibration-proof stepping motor according to claim 1, wherein said lower housing has a side wall defining said internal space of said lower housing, and at least one rib projecting from said side wall into said internal space of said lower housing, said rib being pressfitted with a side wall of said socket-like stator core member.

4. A vibration-proof stepping motor according to claim 1, wherein said upper housing has a bearing hole rotatably supporting an end portion of said rotor shaft, and an annular rib concentric with said bearing hole and projecting from an inside surface of said upper housing into engagement with an upper end of said stator.

5. A vibration-proof stepping motor according to claim 1, wherein said bobbin is formed of a resiliently deformable material.

6. A vibration-proof stepping motor of the type having a stator of a built-up construction, comprising:
   a lower housing having an internal space;
   an upper housing disposed in confrontation to said lower housing; and
   a stator and a rotor disposed between said upper and lower housings, said stator being composed of at least two stator cores disposed one above another in said internal space and each including a pair of stator core members and a coil disposed between said stator core members, said rotor being rotatably disposed in said stator and having a rotor shaft and a rotor body integral with said rotor shaft,
   wherein said lower housing has a bottom surface and a first locking projection on said bottom surface,
   wherein said stator is composed of a socket-like stator core member having a plurality of upstanding magnetic poles and a plurality plug-like stator core members each having a plurality of upstanding magnetic poles, said pluglike stator core members being stacked in said socket-like stator core members with said coil disposed between each adjacent pair of said stator core members, said socket-like stator core member further having a first guide hole and a second guide hole having a diameter different to the diameter of said first guide hole, said first guide hole being fitted with said first locking projection,
   wherein said coil includes a bobbin, windings wound around said bobbin and a plurality of terminals electrically connected with said windings, said bobbin having opposite end flanges between which said windings are disposed, one of said end flanges having a mounting portion carrying thereon said terminals, said one end flange having a second locking projection and a low damper projection, said second projection having a height larger than the thickness of the material of said plug-like stator core members, the other of said end flanges having at least one third projection having a height smaller than the thickness of the material of said stator core members,
   wherein said third locking projection is fitted with said second guide hole of said socket-like stator core member,
   wherein each of said plug-like stator core members has a third guide hole, and said second locking projection is fitted with said third guide hole of an adjacent one of said plug-like stator core members, with said damper projection disposed between said other end flange of each bobbin and said adjacent plug-like stator core member,
   wherein said plug-like stator core members stacked in said socket-like stator core members together with said coils have an upper end projecting from an upper end of said socket-like stator core member, and
   wherein said stator is held by and between said upper and lower housings in a compressed condition.

7. A vibration-proof stepping motor according to claim 2, wherein said coils are stacked such that said one end flange of each of said coils confronts said one flange of the adjacent coil.

8. A vibration-proof stepping motor according to claim 2, wherein said lower housing has a side wall defining said internal space of said lower housing, and at least one rib projecting from said side wall into said internal space of said lower housing, said rib being press-fitted with a side wall of said socket-like stator core member.

9. A vibration-proof stepping motor according to claim 2, wherein said upper housing has a bearing hole rotatably supporting an end portion of said rotor shaft, and an annular rib concentric with said bearing hole and projecting from an inside surface of said upper housing into engagement with an upper end of said stator.

10. A vibration-proof stepping motor according to claim 2, wherein said bobbin is formed of a resiliently deformable material.

11. A vibration-proof stepping motor of the type having a stator of a built-up construction, comprising:
   lower housing having a first internal space;
   an upper housing having a second internal space;
   a support plate held between said upper and lower housings and having a plurality of support shafts projecting into said second internal space;
   a stator and a rotor disposed between said upper and lower housings, said rotor being rotatably disposed in said stator and having a rotor shaft and a rotor body integral with said rotor shaft, said rotor shaft having a pinion at an output end thereof;
   a reduction gear disposed in said second internal space and held between said upper housing and said support plate for lowering the output speed of said rotor shaft;
   said reduction gear including first and second gears rotatably supported on said support shafts, respectively, and held in mesh with each other, said first gear being also held in mesh with said pinion of said rotor shaft;
   said stator being composed of at least two stator cores disposed one above another in said first internal space and each including a pair of stator core members and a coil disposed between said stator core members;
   said stator being composed of a socket-like stator core member having a plurality of upstanding magnetic poles and a plurality plug-like stator core members each having a plurality of upstanding magnetic poles, said plug-like stator core members being stacked in said socket-like stator core members, with said coil disposed between each adjacent pair of said stator core members;
   said coil including a bobbin, windings wound around said bobbin and a plurality of terminals electrically connected with said windings, said bobbin having opposite end flanges between which said windings are disposed, one of said end flanges having a mounting portion carrying thereon said terminals;
   said one end flange having a first projection and a low damper projection, said first projection having a height larger than the thickness of the material of said plug-like stator core members;
   the other of said end flanges having at least one second projection having a height smaller than the thickness of the material of said stator core members; and said plug-like stator core members stacked in said socket-like stator core members together with said coils having an upper ned projecting from an upper end of said socket-like stator core member.

12. A vibration-proof stepping motor according to claim 11, wherein said coils are stacked such that said one end flange of each of said coils confronts said one end flange of the adjacent coil.

13. A vibration-proof stepping motor according to claim 11, wherein said lower housing has a side wall defining said internal space of said lower housing, and at least one rib projecting from said side wall into said internal space of said lower housing, said rib being pressfitted with a side wall of said socket-like stator core member.

14. A vibration-proof stepping motor according to claim 11, wherein said upper housing has a bearing hole rotatably supporting an end portion of said rotor shaft, and an annular rib concentric with said bearing hole and projecting from an inside surface of said upper housing into engagement with an upper end of said stator.

15. A vibration-proof stepping motor according to claim 11, wherein said bobbin is formed of a resiliently deformable material.

16. A vibration-proof stepping motor of the type having a stator of a built-up construction, comprising:

a lower housing having a first internal space;

an upper housing having a second internal space;

a support plate held between said upper and lower housings and having a plurality of support shafts projecting into said second internal space;

a stator and a rotor disposed between said upper and lower housings, said rotor being rotatably disposed in said stator and having a rotor shaft and a rotor body integral with said rotor shaft, said rotor shaft having a pinion at an output end thereof;

a reduction gear disposed in said second internal space and held between said upper housing and said support plate for lowering the output speed of said rotor shaft;

said reduction gear including first and second gears rotatably supported on said support shafts, respectively, and held in mesh with each other, said first gear being also held in mesh with said pinion of said rotor shaft;

said stator being composed of at least two stator cores disposed one above another in said first internal space and each including a pair of stator core members and a coil disposed between said stator core members;

said lower housing having a bottom surface and a first locking projection on said bottom surface, said stator being composed of a socket-like stator core member having a plurality of upstanding magnetic poles and a plurality plug-like stator core members each having a plurality of upstanding magnetic poles, said plug-like stator core members being stacked in said socket-like stator core members with said coil disposed between each adjacent pair of said stator core members, said socket-like stator core member further having a first guide hole and a second guide hole having a diameter different to the diameter of said first guide hole, said first guide hole being fitted with said first locking projection;

said coil including a bobbin, windings wound around said bobbin and a plurality of terminals electrically connected with said windings, said bobbin having opposite end flanges between which said windings are disposed, one of said end flanges having a mounting portion carrying thereon said terminals, said one end flange having a second locking projection and a low damper projection, said second projection having a height larger than the thickness of the material of said plug-like stator core members, the other of said end flanges having at least one third projection having a height smaller than the thickness of the material of said stator core members;

said third locking projection being fitted with said second guide hole of said socket-like stator core member;

each of said plug-like stator core members having a third guide hole, said second locking projection being fitted with said third guide hole of an adjacent one of said plug-like stator core members, with said damper projection disposed between said other end flange of each bobbin and said adjacent plug-like stator core member;

said plug-like stator core members stacked in said socket-like stator core members together with said coils having an upper end projecting from an upper end of said socket-like stator core member;

said stator being held by and between said upper and lower housings in a compressed condition.

17. A vibration-proof stepping motor according to claim 16, wherein said coils are stacked such that said one end flange of each of said coils confronts said one end flange of the adjacent coil.

18. A vibration-proof stepping motor according to claim 16, wherein said lower housing has a side wall defining said internal space of said lower housing, and at least one rib projecting from said wall into said internal space of said lower housing, said rib being press-fitted with a side wall of said socket-like stator core member.

19. A vibration-proof stepping motor according to claim 16, wherein said upper housing has a bearing hole rotatably supporting an end portion of said rotor shaft, and an annular rib concentric with said bearing hole and projecting from an inside surface of said upper housing into engagement with an upper end of said stator.

20. A vibration-proof stepping motor according to claim 16, wherein said bobbin is formed of a resiliently deformable material.

* * * * *